United States Patent [19]

Beauch et al.

[11] Patent Number: 4,724,722
[45] Date of Patent: Feb. 16, 1988

[54] GEARSHIFT AND IGNITION INTERLOCK MECHANISM

[75] Inventors: Howard D. Beauch, Frankenmuth; Gilbert J. Sauve, Saginaw; John P. Sutorik, Frankenmuth, all of Mich.

[73] Assignee: General Motors Corporation, Detroit, Mich.

[21] Appl. No.: 18,038

[22] Filed: Feb. 24, 1987

[51] Int. Cl.$^4$ .................. B60K 41/26; B60R 25/06; G05G 9/12
[52] U.S. Cl. .................. 74/850; 74/483 R; 70/248
[58] Field of Search .............. 70/247, 248; 74/483 R, 74/850

[56] References Cited

U.S. PATENT DOCUMENTS

| | | | |
|---|---|---|---|
| 1,674,315 | 6/1928 | Blossom et al. | 70/248 |
| 1,818,997 | 8/1931 | Martel | 70/247 |
| 1,861,713 | 6/1932 | Norviel | 70/248 |
| 1,903,017 | 3/1933 | Warren et al. | 70/248 |
| 1,940,979 | 12/1933 | Staples | 70/247 |
| 1,972,300 | 9/1934 | Hemingway . | |
| 3,590,613 | 7/1971 | Kimberlin et al. | 70/248 |
| 3,772,941 | 11/1973 | Nevett | 74/850 |
| 3,995,462 | 12/1976 | Boyle | 70/247 |
| 4,474,085 | 10/1984 | DeVogelaere et al. | 70/248 |
| 4,520,640 | 6/1985 | Kramer | 70/248 |
| 4,660,443 | 4/1987 | Simancik | 70/248 |

Primary Examiner—Lawrence Staab
Attorney, Agent, or Firm—Donald F. Scherer

[57] ABSTRACT

A gearshift lever and ignition lock mechanism has a flexible cable interlock connected therebetween. At the ignition lock end of the cable, a slide member is spring-loaded toward an unlock position. The gearshift end of the cable has a spring-loaded pawl disposed thereon. The spring load on the slide member is greater than the spring load on the pawl, such that the combination of these loads continuously urge the slide member toward the unlock position. The pawl is engaged by the gearshift lever when the gearshift lever is manipulated to the park position as controlled by a detent plate. A return spring on the shift lever moves the shift lever, pawl and slide member against the combined spring load in the flexible cable to a park position. In this position, the ignition key mechanism can be manipulated to the lock position for key removal; and a ramp on the slide member is contacted by a portion of the ignition lock to prevent the slide member from moving toward the unlock position. A shoulder on the pawl cooperates with the detent plate and the shift lever to prevent the removal of the gearshift lever from the park position prior to the manipulation of the ignition key from the lock position, and the upper space of the ramp prevents manipulation of the ignition lock to the lock position prior to movement of the gearshift lever to the park position.

2 Claims, 4 Drawing Figures

GEARSHIFT AND IGNITION INTERLOCK MECHANISM

BACKGROUND OF THE INVENTION

This invention relates to interlock mechanisms and more particularly to interlock mechanisms disposed between a vehicle transmission shift lever and a vehicle ignition lock mechanism.

SUMMARY OF THE INVENTION

It is an object of this invention to provide an improved transmission gearshift lever and ignition interlock mechanism for preventing manipulation of the ignition lock to the Lock position prior to manipulation of the gearshift lever to the Park position, and also for preventing manipulation of the gearshift lever out of the Park position prior to manipulation of the ignition lock from the Lock position, wherein a flexible cable which interconnects the ignition and the lever has spring-loaded end components cooperating with the lock mechanism and the lever, and also wherein the shift lever has a return spring which is sufficiently strong to overcome the spring load on the end components when the lever engages one end component in the Park position to move the end components of the cable to a position permitting the ignition lock to be manipulated to the Lock position, and further wherein the spring load of the end component at the ignition end moves to an unlock position when the shift lever is moved from the Park position.

It is another object of this invention to provide an improved interlock between the gearshift lever and an ignition lock wherein spring forces operate on the interlock and gearshift lever to provide positioning of the interlock elements to prevent removal of the gearshift lever from the Park position prior to unlocking the ignition lock and also to prevent locking of the ignition lock prior to shifting the gearshift lever to the Park position.

These and other objects and advantages of the present invention will be more apparent from the following specification and drawings.

DESCRIPTION OF THE PREFERRED EMBODIMENT

Figure 1:
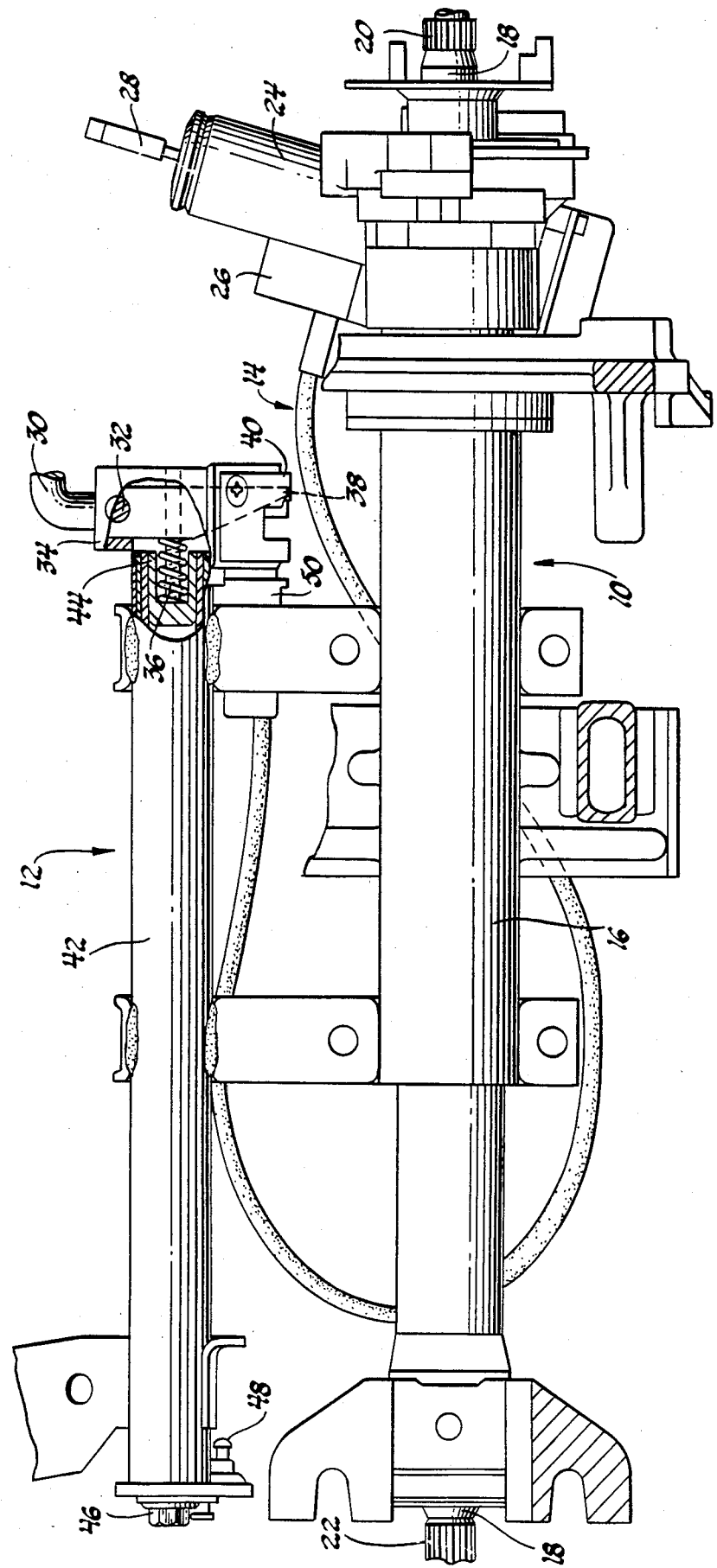
FIG. 1 is an elevational view of a shift lever and lock mechanism incorporating the present invention.

Referring to the drawings, wherein like characters represent the same or corresponding parts throughout the several views, there is seen in FIG. 1 a steering column assembly, generally designated 10, and a transmission shift column assembly, generally designated 12. These assemblies are interconnected by a flexible cable interlock mechanism, generally designated 14.

The steering column assembly 10 includes a mast jacket 16 in which is rotatably disposed a steering shaft 18. The steering shaft 18 is designed to be connected at the upper end 20 to a steering wheel (not shown) and at the lower end 22 to a steering gear mechanism (not shown). The construction and interconnection of these elements is well-known. The terms upper, lower, left, right, clockwise and counterclockwise are relative designations of movement or position when the drawings are viewed in a conventional manner. These terms are not meant to be limits on structures incorporating the present invention.

An ignition locking mechanism 24 is secured to the steering column assembly 10 and is also connected through an end assembly 26 with the flexible cable interlock 14. The ignition lock mechanism 24 is manually controlled by a key 28 which may be manipulated between the Lock position "L" shown in FIG. 2, to the Run position "R" shown in FIGS. 3 and 4. The ignition lock mechanism 24 has other key positionable locations, such as Start, Off and Acc(accessory).

The shift column assembly 12 includes a shift lever 30 which is pivotally mounted on a pivot axis 32 within a housing 34. The shift lever 30 is urged counterclockwise about the pivot axis 32 by a spring member 36. The left end 38 of shift lever 30 is disposed in operating relationship with a detent plate 40 secured to a stationary portion of the shift column assembly 12. The spring 36 urges the end 38 of shift lever 30 into the transmission operating position established by various notches in the detent plate 40. This type of shift lever positioning mechanism has been utilized in automatic transmissions for many years.

The shift column assembly 12 includes a stationary jacket portion or housing 42 in which a shift tube 44 is rotatably mounted. The shift tube 44 is connected with the shift lever housing 34 such that rotation of the shift lever housing 34 about the axis of spring 36 will cause rotation of the shift tube 44. As is well-known, the shift lever 30 can be rotated through an arcuate extent determined by the detent plate 40. Due to the notches in the detent plate 40, manipulation of the shift lever 30 can require pivoting in a clockwise direction about axis 32 prior to rotation of the shift tube 44 within the housing 42. The lower end 46 of shift tube 44 has secured therewith a ball stud 48 which is connectible with a transmission shift linkage or cable in a well-known manner.

Figure 2:
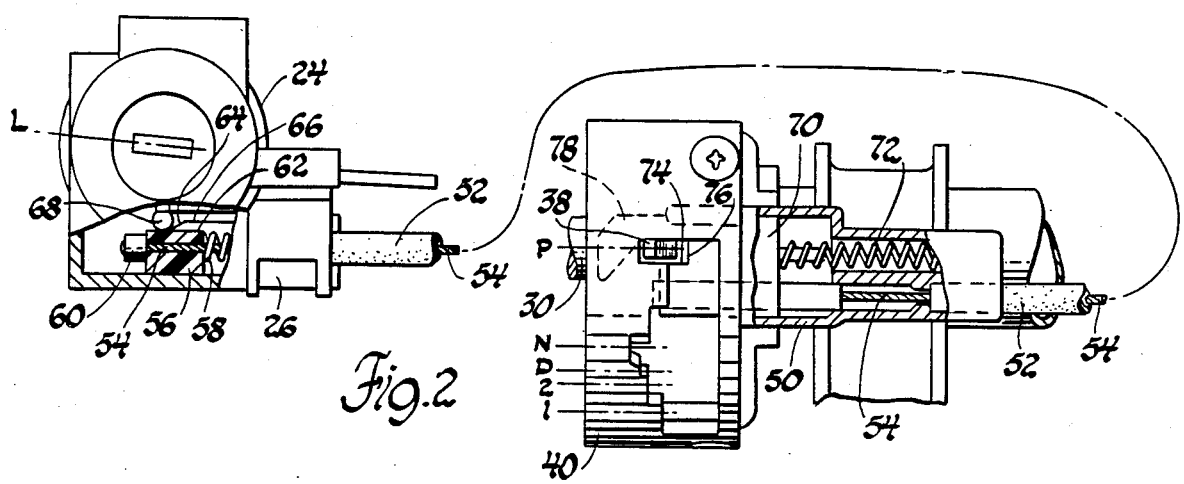
FIG. 2 is a partial diagrammatic representation of the interlock mechanism with the lock and transmission shift lever in one operating position.
Figure 3:
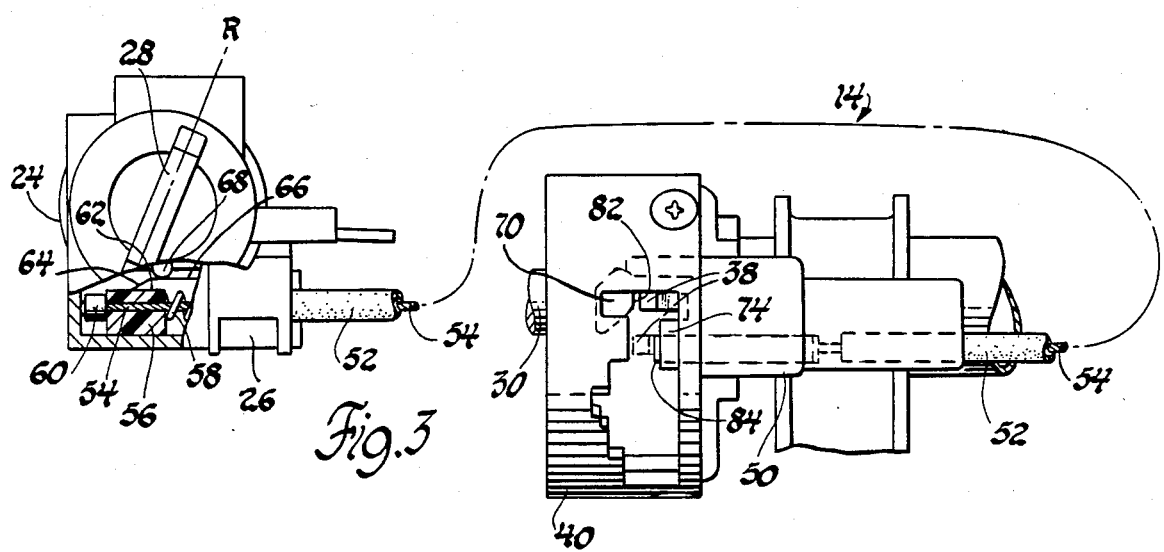
FIG. 3 is a view similar to FIG. 2 depicting another operating position of the mechanism.
Figure 4:
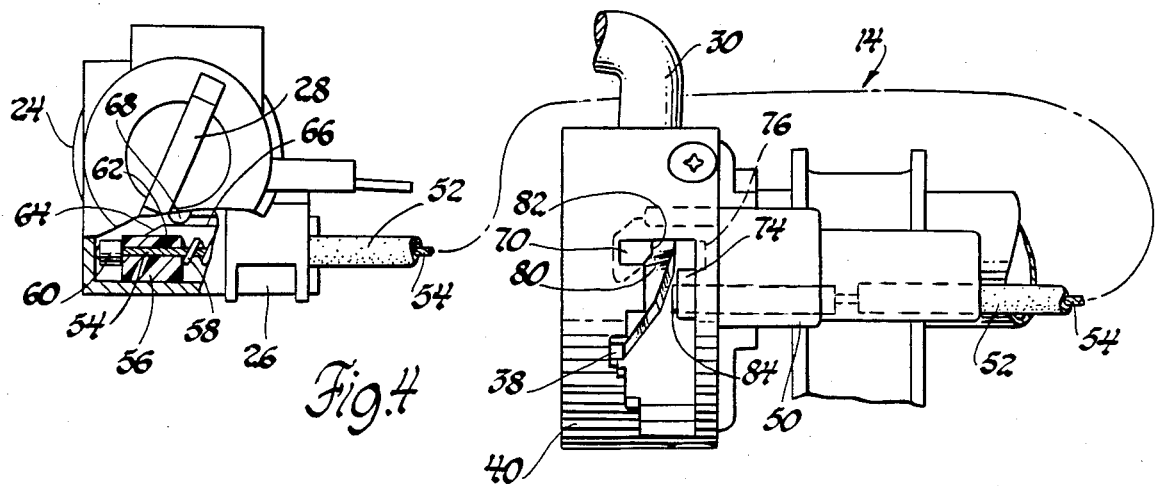
FIG. 4 is a view similar to FIG. 2 depicting a further operating position of the mechanism.

As best seen in FIGS. 2 through 4, the detent plate 40 has a plurality of notches or stop locations which are designated "P" Park, "N" Neutral, "D" Drive, "I" Intermediate and "L" Low. The operation of the transmission in each of these conditions is well-known. For example, in the Park "P" position, the transmission has one or more components grounded to a stationary casing such that rotation of the drive wheels is not permitted.

The flexible interlock mechanism 14 has an end 50 which is secured to the shift column assembly 12. Thus, the flexible interlock mechanism 14 is connected between the ignition lock 24 and the shift column assembly 12. FIGS. 2 through 4 describe the various operating conditions which might occur as the result of manipulation of either the lock assembly or the shift assembly or both.

In FIGS. 2 through 4, it is seen that the flexible cable interlock 14 includes a stationary housing or sheath 52 in which is slidably disposed a cable 54. The sheath 52 is secured to both assembly 26 and end assembly 50. The assembly 26 has slidably disposed therein a slide member 56 which is operatively connected with the cable 54. As can be seen in FIGS. 2 through 4, the slide member 56 is operated on by a helical spring 58 which urges the slide member 56 leftward on the cable 54 against a stop member 60.

The slide member 56 has formed thereon a ramp 62 which has a tapered portion 64 and a flat surface 66.

The lock mechanism 24 has a latch pin 68 which is movable vertically within the lock mechanism 24 by manipulation of the key from the Lock position "L", shown in FIG. 2, to the Run position "R", shown in FIGS. 3 and 4. The latch pin 68, as seen in FIGS. 2 through 4, cooperates with the ramp 62 to establish an operating limit of the slide member 56 when the Lock position is attained.

As seen in FIG. 2, the latch pin 68 abuts the lower end of the taper 64 such that leftward movement of the slide member 56 is not permitted when key 28 is in the Lock position "L". When the key 28 is manipulated to the Run position "R", or out of the Lock position "L", the latch pin 68 is moved vertically so that the slide member 56 is free to move leftward under the urging of spring 58.

The end assembly 50 of flexible interlock mechanism 14 is also secured to the sheath 52. The end assembly 50 has slidably disposed therein a pawl member 70 which is slidably disposed on the cable 54 and urged leftward thereon, as viewed in FIG. 2, by a spring 72 against a stop member 84. The spring 72 has less of a stored force than the spring 58 such that if no other external forces operate on the interlock mechanism 14, the spring 58 will move slide member 56 leftward and pawl 70 rightward, as viewed in FIGS. 2 through 4.

The pawl 70 has a shoulder 74, a notch portion 76 and a finger 78. These elements cooperate to form an opening 80 into which the end 38 of shift lever 30 may be manipulated. The finger 78 has a flat portion 82 which is engaged by the end 38 of shift lever 30 whenever the shift lever 30 is manipulated to the Park position and released by the operator.

The spring 36, as previously mentioned, will urge pivoting of the shift lever 30 about axis 32 so that the end 38 of shift lever 30 will be positioned within a notch at the Park position in the detent plate 40. The spring 36 is designed to have a force that is significantly greater than the net force of springs 58 and 72. When the end 38 abuts the flat 82, the spring 36 will enforce leftward movement of the pawl 70. Since leftward movement of the pawl 70 relative to the cable 54 is limited by the stop member 84, the cable 54 will be moved leftward. This will cause rightward movement of slide member 56 to the Lock position shown for the slide member 56 in FIG. 2. When disposed in this position, the ignition lock 24 can be manipulated by the key 28 to the Lock position and the key can be removed.

With the mechanism in the Lock position shown in FIG. 2, the shift lever 30 is prevented from being rotated out of the Park position through the abutment of end 38 with either the detent plate 40 or the shoulder 74 of pawl 70. With the lock mechanism 24 in the Lock position, the force of spring 58 is grounded by the latch pin 68 such that the spring 58 cannot cause leftward movement of the slide 56. Under this condition, the spring 72 is the controlling factor for a leftward movement of the pawl 70. Therefore, if the operator pivots the lever 30 in an effort to remove the lever from the detent 40, the pawl 70 will remain in the leftward position shown in FIG. 2 such that abutment between the end 38 and shoulder 74 will occur.

Even if the end 38 abuts the notch 76 thereby causing rightward movement of the pawl 70, the shoulder 74 will still prevent rotation of the shift lever 30 and therefore not permit removal from the Park position.

When it is desirable to operate the vehicle, the operator will manipulate the key 28 out of the Lock position thereby freeing the slide member 56 from the influence of latch pin 68. This will permit the slide member 56 to be moved to the free or unlocked position, shown in FIGS. 3 and 4, when the external influence of the shift lever 30 is removed.

As seen in FIG. 3, when the shift lever 30 is pivoted for removal from the Park position, the pawl 70, under the influence of spring 58, will move rightward such that the end 38 can be manipulated between the pawl 70 and the detent plate 40. Therefore, the operator can select another operating condition such as Neutral, Drive, etc. In FIG. 4, the shift lever 30 is shown as being disposed in the Neutral condition.

Whenever the shift lever 30 is removed from the Park position, the slide member 56 will be moved to the unlocked position shown in FIG. 4. In this position, the latch pin 68 is restrained from moving vertically downward such that manipulation of the key 28 to the Lock position is prevented. Since the key 28 can only be removed from the ignition lock 24 in the locking position, the operator will not be able to remove the key. This requires shifting of the shift lever 30 to the Park position such that the slide member 56 will be forced to the locked position shown in FIG. 2. After this maneuver, the lock 24 can be manipulated by the key 28 to the Lock position and the key can be removed. As pointed out above, this locked condition prevents manipulation of the shift lever from the Park position.

From the foregoing description of this invention, it should be seen that the interlock mechanism proposed is a very flexible system and permits the positioning of the shift lever and ignition lock at a variety of positions within the vehicle passenger compartment. For example, the shift lever assembly and the steering column can be separated, as shown in FIG. 1. The shift lever can be positioned elsewhere on the instrument panel or the console between the driver and passenger seats. It is preferable to place the ignition lock on the steering column such that locking of the steering column in a well-known manner could be utilized. However, it is possible to provide other locking mechanisms between the ignition lock and the steering column thereby permitting relocation of the lock mechanism.

It should also be appreciated from the above discussion that if the cable 54 and sheath 52 should be severed, while the transmission is in the Park position, the spring 72 will prevent manipulation from the Park position regardless of the position of the slide member 56. While this will not absolutely prevent unauthorized operation of the vehicle, it will retard such unauthorized operation.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An interlock mechanism for a gearshift lever and an ignition lock comprising; a transmission shift lever housing; a transmission gearshift lever means pivotally and rotatably mounted in said housing including lever spring means for urging the shift lever in one pivotal direction; detent plate means secured to said shift lever housing and including a plurality of shift position locating means to locate said shift lever at rotational positions thereof including a Drive position and a Park position, said lever spring means urging said lever into said shift position locating means; an ignition locking mechanism operable to be manipulated to a plurality of operations including a Lock position and a Run position; and interlock cable means operatively connected between said transmission shift lever housing, said transmission gearshift lever means and said ignition locking mechanism for preventing movement of said gearshift lever means from said Park position to said Drive position when said ignition locking mechanism is in said Lock position and for preventing manipulation of said ignition locking mechanism from said Run position to said Lock position when said gearshift lever means is out of said Park position, said interlock cable means comprising a flexible cable, slider means disposed on said cable, lock spring means having a stored force urging said slider means and said cable to a free position, ramp means on said slider means cooperating with said ignition locking mechanism for preventing said slider means from moving to said free position when said ignition locking mechanism is in said Lock position and said ramp means preventing said ignition lock mechanism from being manipulated to said Lock position when said slider means is in said free position, park pawl means operatively connected with said cable means and slidably disposed in said shift lever housing and being engageable by said gearshift lever means when said gearshift lever means is rotated to said Park position, pawl spring means having a stored force urging said park pawl means to a Park position in opposition to said lock spring means, said lock spring means stored force being greater than said pawl spring means stored force, said lever spring means having a higher stored spring force than said lock spring and acting to urge said pawl means to said pawl Park position and said slider means out of said free position when said gearshift lever means is in said Park position, and shoulder means on said pawl means for preventing rotation of said gearshift lever from said Park position when said slider means is held out of said free position by said ignition lock mechanism, said pawl means being free from said gearshift lever means when said gearshift lever means is out of said Park position to permit said lock spring to move said slider to said free position.

2. An interlock mechanism for a gearshift lever and an ignition lock comprising; a transmission shift lever housing; a transmission gearshift lever means pivotally and rotatably mounted in said housing including lever spring means for urging the shift lever in one pivotal direction; detent plate means secured to said shift lever housing and including a plurality of shift position locating means to locate said shift lever at rotational positions thereof including a Drive position and a Park position, said lever spring means urging said lever into said shift position locating means; an ignition locking mechanism operable to be manipulated to a plurality of operations including a Lock position and a Run position and having a latch pin; and interlock cable means operatively connected between said transmission shift lever housing, said transmission gearshift lever means and said ignition locking mechanism for preventing movement of said gearshift lever means from said Park position to said Drive position when said ignition locking mechanism is in said Lock position and for preventing manipulation of said ignition locking mechanism from said Run position to said Lock position when said gearshift lever means is out of said Park position, said interlock cable means comprising a flexible cable, slider means slidable disposed on said cable, slider stop means for limiting sliding of said slide means in one direction on said cable, lock spring means having a stored force for urging said slider means and said cable toward an unlocked position, ramp means on said slider means cooperating with said latch pin of said ignition locking mechanism for preventing said slider means from moving to said unlocked position when said ignition locking mechanism is in said Lock position and said ramp means preventing said ignition lock mechanism from being manipulated to said Lock position when said slider means is in said free position, park pawl means slidably operatively connected with said cable means and being slidably disposed in said shift lever housing and being engageable by said gearshift lever means when said gearshift lever means is rotated to said Park position, a stop means secured to said cable means for limiting sliding of said park pawl means on said cable means in one direction, pawl spring means having a stored force urging said park pawl means toward said stop means on said cable means to oppose said lock spring means, said lock spring means stored force being greater than said pawl spring means stored force, said lever spring means having a higher stored spring force than said lock spring and acting to urge said pawl means against said stop means and thereby acting on said cable means to urge said slider means out of said unlocked position when said gearshift lever means is in said Park position, and shoulder means on said pawl means for preventing rotation of said gearshift lever from said Park position when said slider means is held out of said unlocked position by said ignition lock mechanism, said pawl means being free from said gearshift lever means when said gearshift lever means is out of said Park position to permit said lock spring to move said slider to said unlocked position.

* * * * *